Jan. 5, 1943.   H. H. WOODRUFF   2,307,177
PUNCHING MACHINE
Filed April 1, 1941   9 Sheets-Sheet 1
FIG. 1.
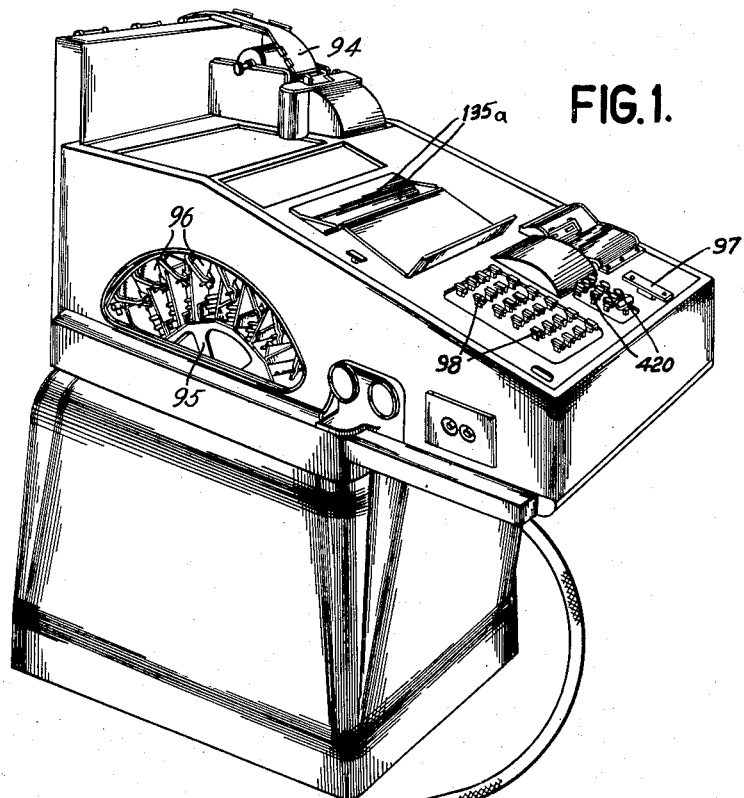
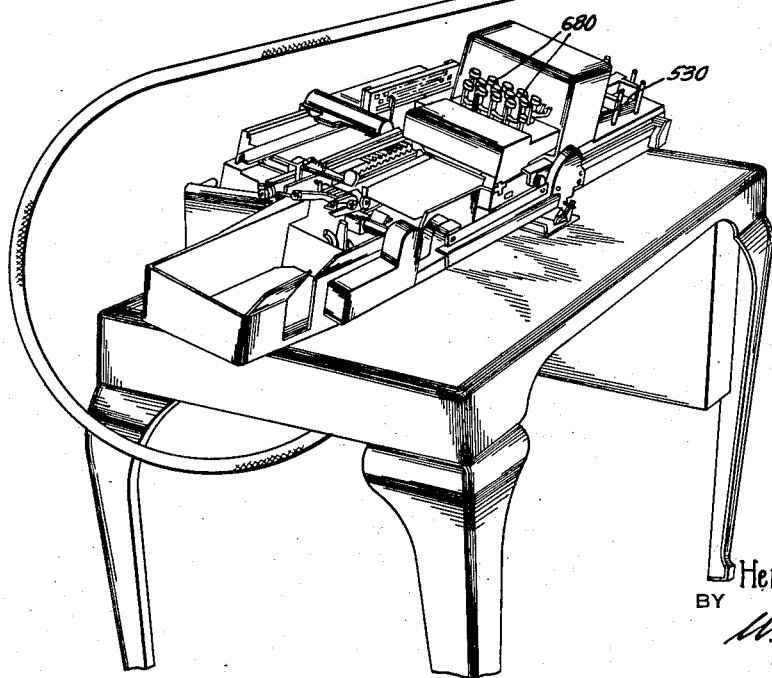
INVENTOR
Herbert H. Woodruff
BY
ATTORNEY

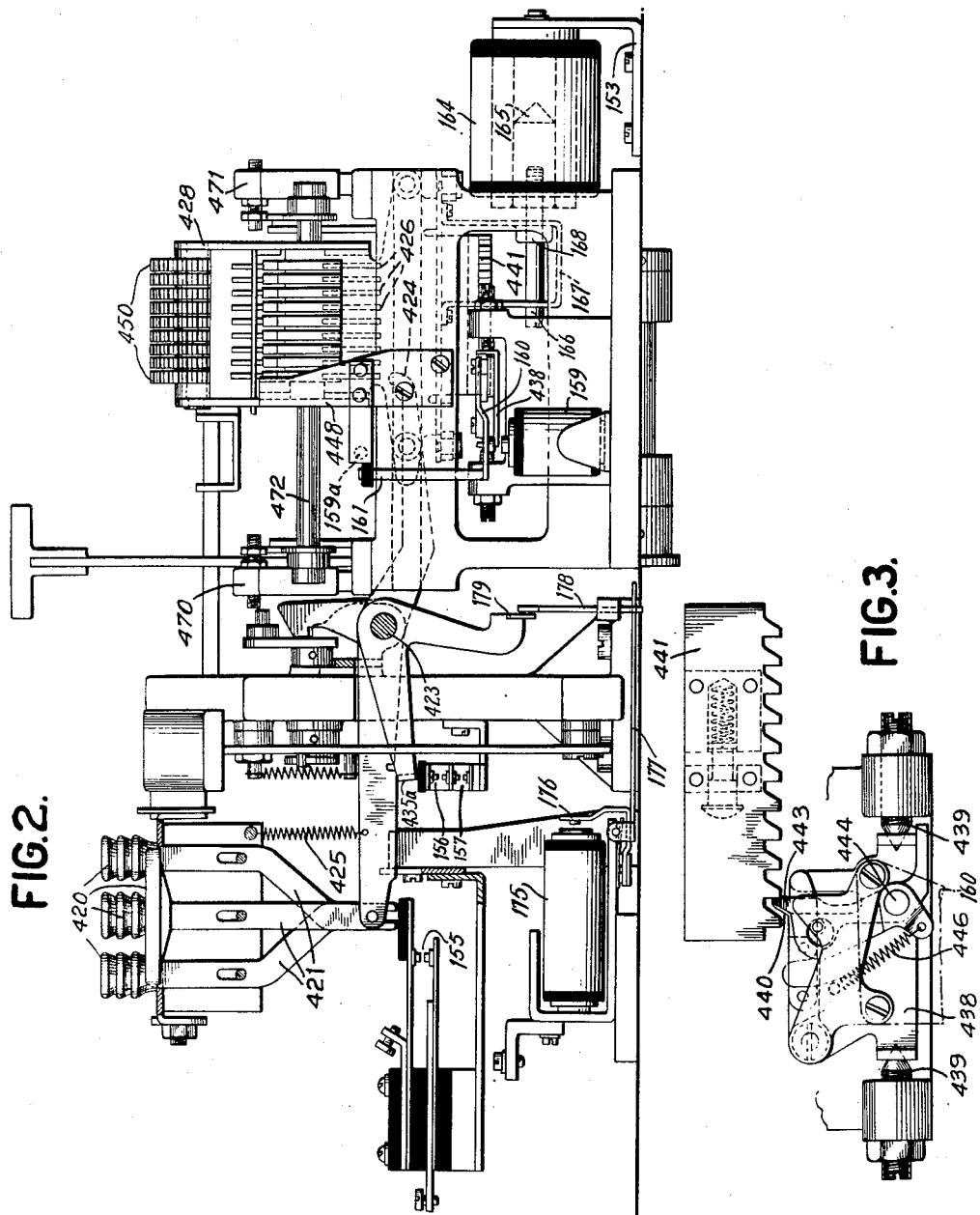

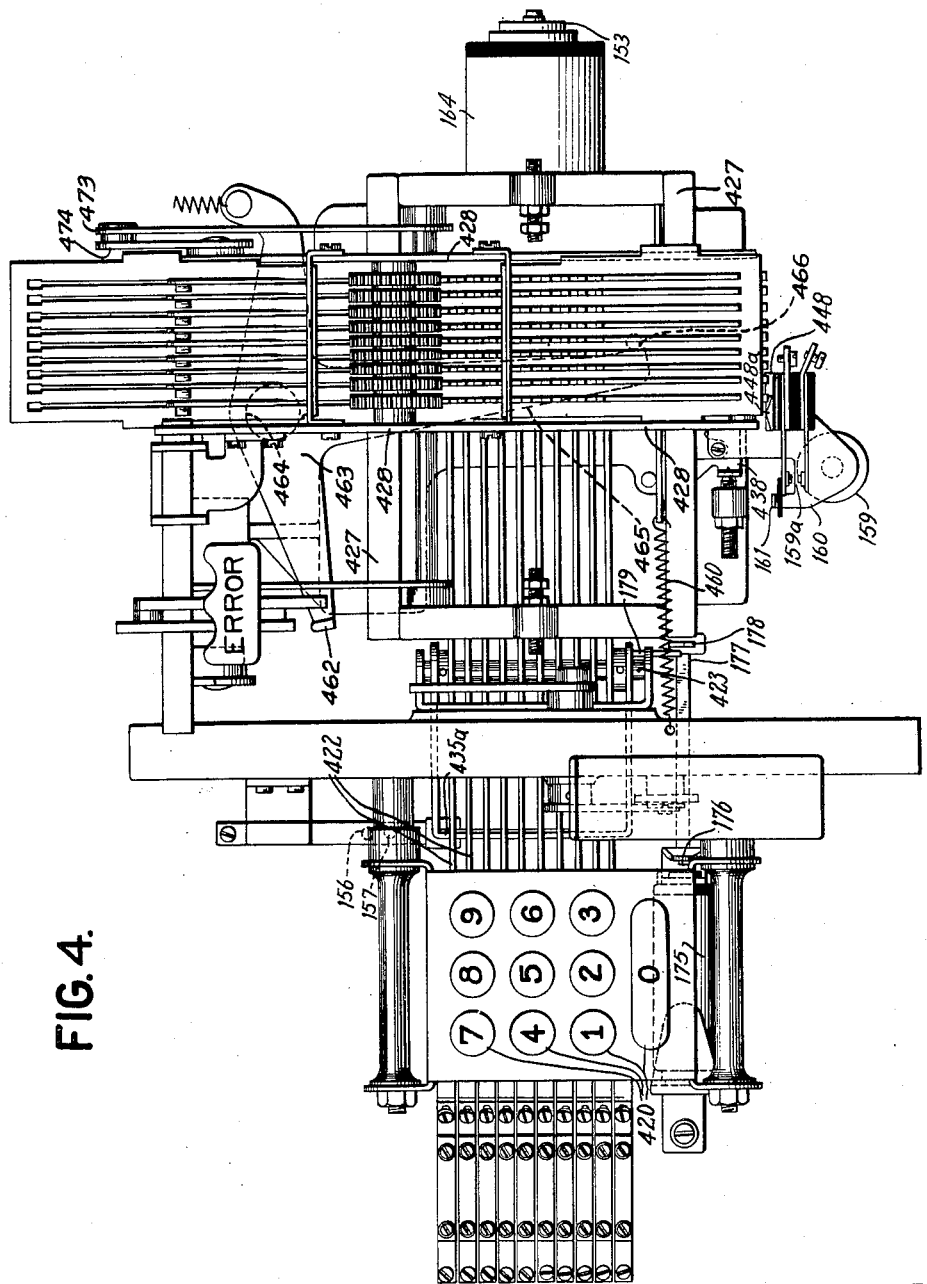
FIG. 4.
INVENTOR.
Herbert H. Woodruff
BY
ATTORNEYS.

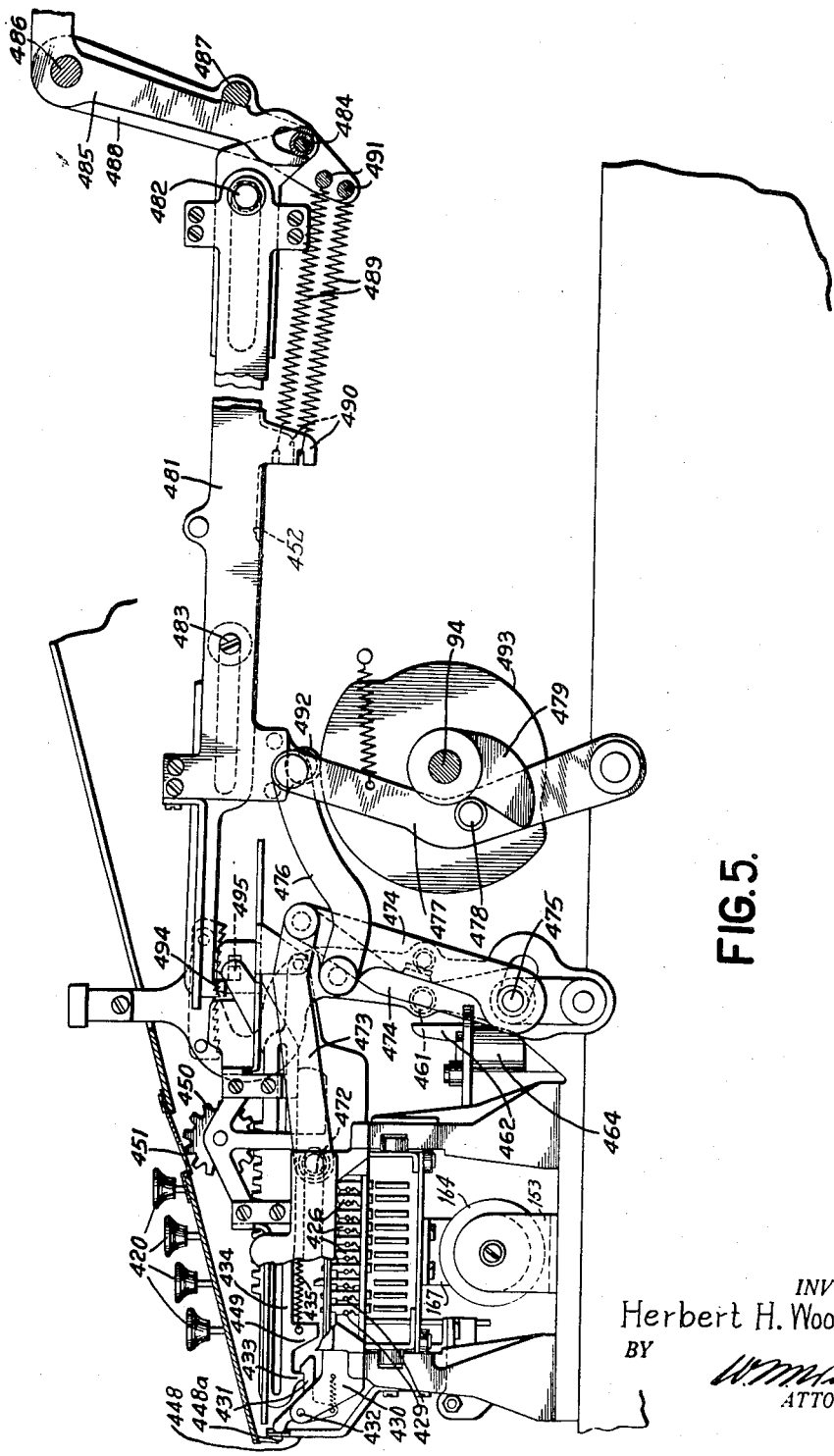

Jan. 5, 1943. H. H. WOODRUFF 2,307,177
PUNCHING MACHINE
Filed April 1, 1941 9 Sheets-Sheet 5

INVENTOR
Herbert H. Woodruff
BY
ATTORNEY

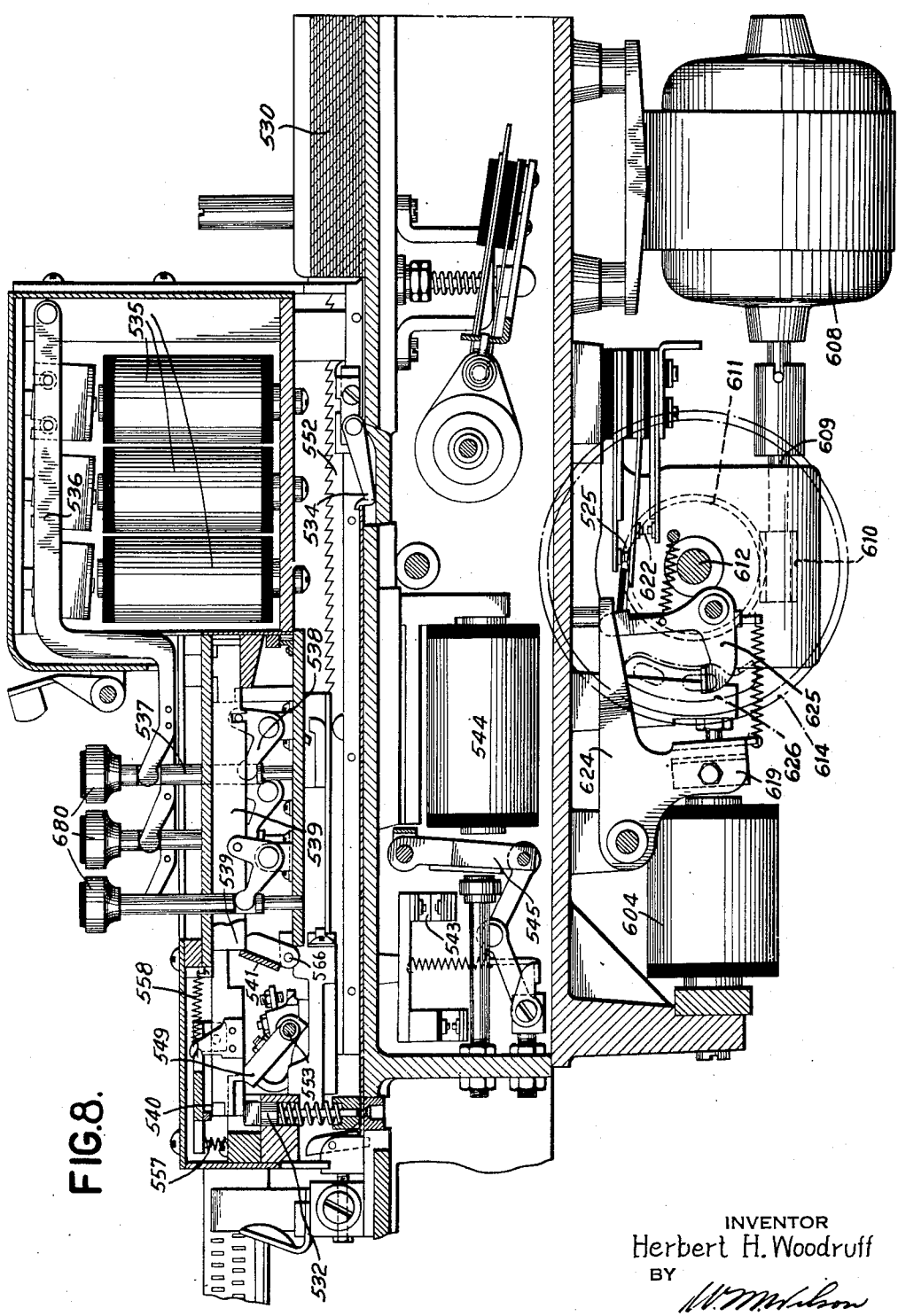

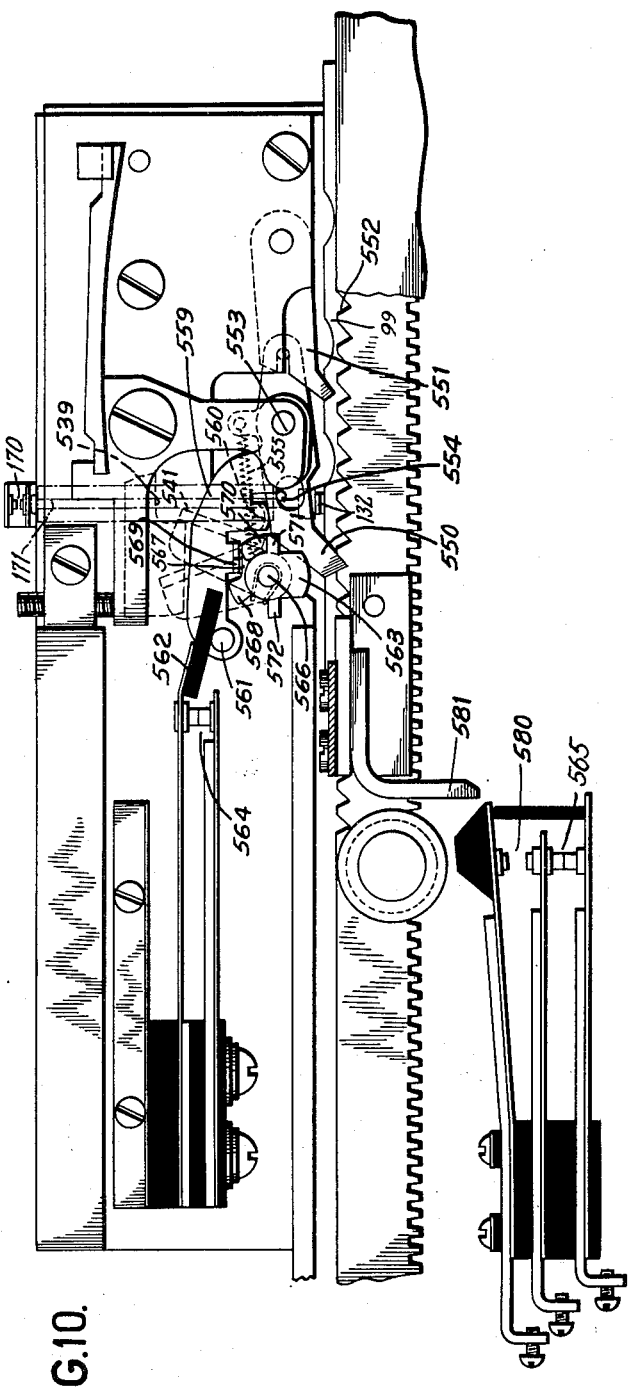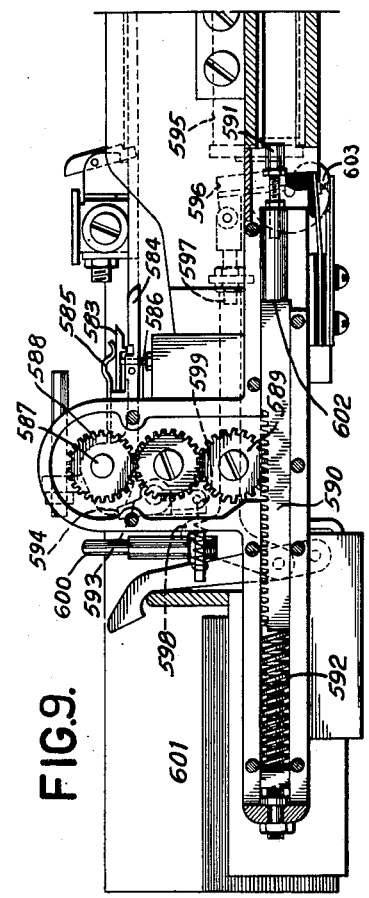

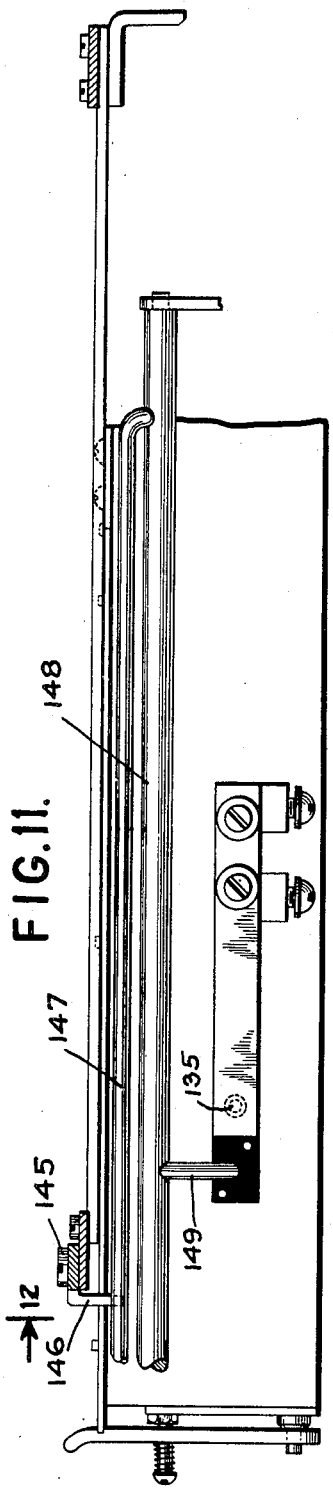
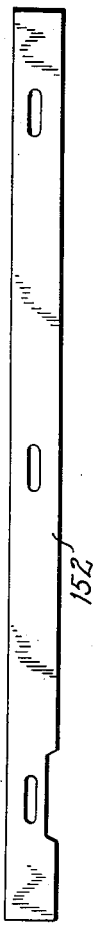
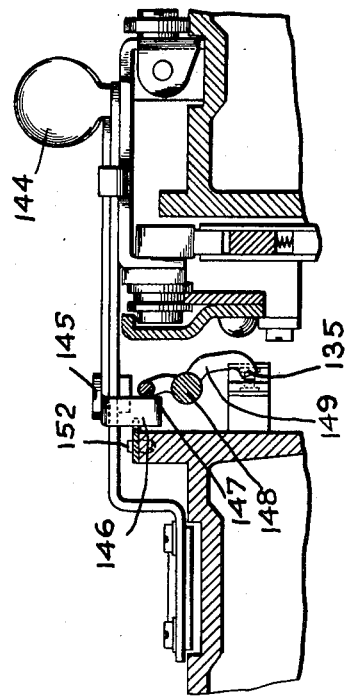

Jan. 5, 1943.  H. H. WOODRUFF  2,307,177
PUNCHING MACHINE
Filed April 1, 1941  9 Sheets-Sheet 9

INVENTOR
Herbert H. Woodruff
BY
ATTORNEY

Patented Jan. 5, 1943

2,307,177

UNITED STATES PATENT OFFICE 2,307,177

PUNCHING MACHINE

Herbert H. Woodruff, Detroit, Mich., assignor to International Business Machines Corporation, New York, N. Y., a corporation of New York Application April 1, 1941, Serial No. 386,287

12 Claims. (Cl. 164—113)

This invention relates to improvements in punching machines for combined sorting and accounting machines of the type shown in the patent to F. L. Fuller, No. 1,966,623, and to F. L. Fuller et al., No. 2,142,352 and relates particularly to improvements in such forms of machine whereby a punching attachment may be combined therewith to punch records with data corresponding to checks which are sorted, totalized and listed in the combined sorting and accounting machine.

The present invention is to be considered as consisting of improvements over the machines shown in the patents to S. Brand, Nos. 2,161,612 and 2,131,912. The present improvements relate to an arrangement whereby the classification numbers on the checks may be punched on cards under control of the same setup mechanism utilized to control entries in the accounting machine.

It is an object of the present invention to devise an attachment for a check sorting and accounting machine which will cause, by a common keyboard, the punching on a tabulating card of not only the amounts of the checks sorted in the miscellaneous compartment but also the classification numbers of such checks.

It is a further object of the invention to enable the punching of both the classifications and the amounts of the checks on the tabulating cards under control of the same keys utilized for controlling the accounting section of the machine.

More specifically it is an object of the present invention to disable the setup mechanism under control of the keys controlling the accounting section of the machine so that these setup operations will be ineffective while the keys are being depressed to cause the punching of classification numbers on the tabulating cards.

A still further object of the invention in connection with the last mentioned arrangement is to devise such mechanism so that it is placed under control of a sorting control key relating to the miscellaneous checks.

More specifically, it is an object of the present invention to provide an electrical control under control of the miscellaneous compartment selecting key which will render ineffective the operation of the setup mechanism of the accounting machine while the ten keys of a keyboard relating to the accounting machine section are being operated to punch the classification number on the tabulating card.

A still further object of the invention is to provide means under control of the punching machine whereby the setup mechanism of the accounting machine, which was normally ineffective while classification numbers were being punched under control of the ten key keyboard, will be automatically rendered effective upon the termination of the punching of the tabulating card with the classification numbers.

A still further object is to enable the punching of a tabulating card to represent the amounts of the checks as such amounts are set up in the setup mechanism of the accounting section of the machine.

A still further object of the invention is to provide particularly, automatically operated controlling means whereby the accounting machine setup mechanism will be rendered ineffective and effective at predetermined times in the operation of the ten keys of the keyboard of the accounting machine, whereby the operator need only depress the ten keys to set up the data in both the accounting machine and the punching machine and perform such setup operations without any attention on the operators' part to determine the function and manner of operation of the punching machine.

A still further object of the invention is to provide certain controlling mechanism which will enable the disconnection between the punching machine and the ten key keyboard of the accounting machine in the event that miscellaneous checks are not to be sorted or totalized and, furthermore, to incorporate certain interlocking means which will prevent accidental or intentional misoperations of the machine. The last named interlocking means refers, particularly, to locking devices for the ten key keyboard of the accounting machine which will prevent their operations; (a) while the card carriage of the punching machine is being skipped to the last column position and during subsequent ejection of the punched tabulating card and (b) to prevent the operation of the ten key keyboard of the accounting machine when the machine detects the failure of a card to be fed to the card bed of the punching machine. The last mentioned interlocking means will always insure that a tabulating card will be punched each time it is necessary to punch one to represent the data of the miscellaneous check.

It is pointed out that the perforating of tabulating cards which represents the miscellaneous checks increases the capacity of the combined accounting-sorting machine since such tabulating cards bear the classification numbers of the checks as well as the amounts. The classification data enables the sorting of such records by existing sorting machines and the sorted groups of tabulating cards are then passed through a tabulating machine which will list the amounts in accordance with the classifications on the checks. This will provide classified lists of checks according to the classifications of these miscellaneous checks which will, in effect, augment the capacity of the accounting machine. The miscellaneous checks are preferably deposited into a common sorting compartment and such checks may be further sorted by a manual operation or by supplemental operations of the check sorting machine in the usual manner.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a perspective view showing the check sorting-accounting machine at the top of the sheet and the interconnecting punching machine at the lower part.

Fig. 2 is a view in front elevation of the ten key setup mechanism of the sorting-accounting machine for setting up the classification numbers and amounts on the checks which are at times to be punched on cards.

Fig. 3 is a detail view of an escapement mechanism.

Fig. 4 is a plan view of the ten key setup mechanism of the accounting machine.

Fig. 5 is a longitudinal sectional view showing the ten key setup mechanism and associated settable rack devices utilized for setting up certain instrumentalities in the accounting section of the machine.

Fig. 8 is a longitudinal sectional view of the punching machine on an enlarged scale.

Fig. 9 is a view in side elevation of the left end of the punching machine showing the card ejecting mechanism therefor.

Fig. 10 is a detail view illustrating certain contact making mechanism of the punching machine controlled by the card carriage.

Fig. 11 is a detail view of the contact operating mechanisms for one of the contacts utilized in connection with the present invention.

Fig. 11a is a detail view showing the construction of one of the controlling bars used for the arrangement shown in Fig. 11.

Fig. 12 is a sectional view taken on the line 12—12 of Fig. 11.

General operation of machine

Figure 7:
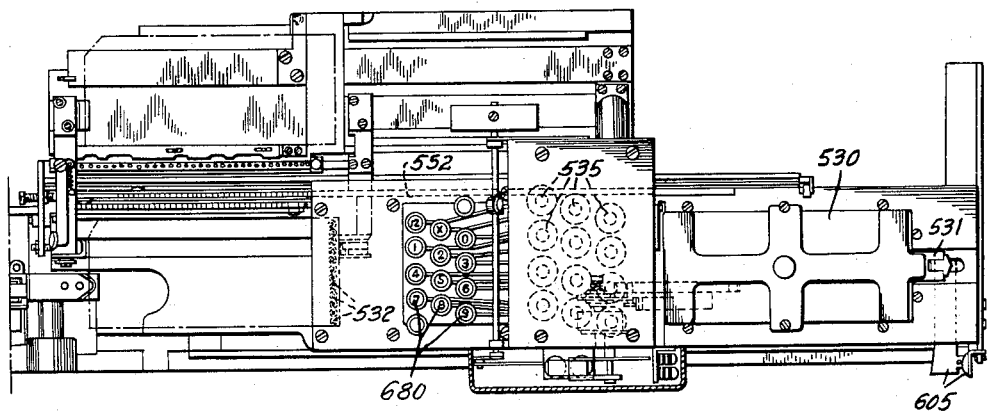
Fig. 7 is a plan view of the automatic card punching machine.

The present improvements are preferably applied to the form of combined sorting and accounting machine shown in the U. S. Patents No. 1,966,623 issued to F. L. Fuller, dated July 17, 1934, and No. 2,142,352 issued to F. L. Fuller and S. Brand, dated January 3, 1939, but it is to be understood that the present disclosure is merely illustrative.

The present machine is also to be considered as an improvement over the combined check sorting machine with a card punching attachment shown in the U. S. Patent No. 2,131,912 issued to S. Brand, dated October 4, 1938. In order to better understand the present improvements, there will be given a general description of the construction and operation of the combined sorting machine with the card punching attachment.

The assembled sorting and accounting machine is shown in Fig. 1 at the top and represents the form of machine which is now used commercially in banks to simultaneously list and sort a group of promiscuously arranged checks. The operator is provided with a series of checks which have different classifications and in accordance with their classifications, one of the compartment selecting keys 98 is depressed. Through a control mechanism, a drum 95 is rotated so as to bring a selected check sorting compartment 96 into registration with an aperture 135a in which the check to be sorted is inserted. The function of the machine shown in the aforementioned patents is to effect the entries of the amounts on the checks selectively in a plurality of totalizers and to cause the listing of amounts on the check upon a control tape 94 and also upon separate record tapes which are associated with the plurality of sorting compartments. To provide for the entry and listing of the amounts, the machine is provided with ten keys 420 which are initially depressed so as to control the setting on suitable setup mechanism of amounts equal in value to the keys struck. After the amount has been set up on the setup mechanism, the operator then inserts the check in the aperture 135a and depresses a motor release bar 97. A number of functions are then performed, one of which is the feeding of the inserted check into the selected compartment and also the positioning of totalizer actuators and printing mechanism in order that the amounts may be entered in the grand totalizers and selectively in a plurality of totalizers which are associated with the compartments 96 and, furthermore, one of a plurality of printing mechanisms associated with the compartments will be selected for operation so as to print the amount on the selected compartment tape. A common printing mechanism is concomitantly adjusted so as to print the same amount on the control tape 94.

The machine is provided with twenty-four compartment totalizers which correspond in number to the number of sorting compartments in the sorting drum and the individual compartment totalizers and printing mechanisms. Ordinarily, this number will suffice but in special circumstances it is preferable to provide for additional classifications which are beyond the capacity of the machine. To this end, one of the compartment selecting keys 98 is associated with a group of classifications on the checks so that one sorting compartment 96 will receive checks of more than one classification. The totalizer associated with this compartment will, of course, give the total of the amounts on the checks of these extra classifications, but will not segregate the items according to their classifications nor will the printing mechanism provide for the listing of the items upon the checks according to these extra classifications and to provide for this it was the purpose of the improvement shown in the patent to S. Brand, No. 2,131,912, dated October 4, 1938, to combine with such sorting machine a card punching attachment. As more fully disclosed in the last mentioned patent, the depression of the keys 420 will set up additional mechanism which will punch a card in the punching machine which represents the amount on the check. However, for the sorting of such punched records according to the classifications, of the checks, it is necessary that the punched records contain perforations representing the classifications and this was attained in the last mentioned patent by the separate operation of keys 680 of the punching machine. This would require an operator to operate the keys 420 to cause the punching of an amount on the record and also the operation of the keys 680 to punch the classification. It is not possible in the Brand Patent No. 2,131,912, to cause the punching of the classifications by the keys 420 because the setup mechanism controlled by such keys would cause the entry of the classification numbers in the accumulators which, of course, would be meaningless since such numbers are not to be accumulated since they are merely for the purpose of identity.

The present machine is provided with an arrangement which enables the punching of classification numbers on the record cards automatically under control of the keys 420 without their entry in the totalizers and printing mechanism, and performs such function automatically without any attention by the operator.

It is thought unnecessary to disclose herein or give further details of the description of the construction and operation of the sorting machine with regard to the manner in which checks are sorted, or the manner in which the amounts are selectively accumulated, or for printing upon the various control tapes.

The present disclosure will, therefore, be confined to the description of the setup mechanism controlled by the keys 420 for controlling the punching on a card of these amounts, as well as the classification of such amounts. It is to be understood that for such checks there will be a sorting operation which will cause the depositing of the related checks into a common sorting compartment 96. These miscellaneous checks are, therefore, all sorted into one compartment since, for their separate classifications, there is an insufficient number of compartments.

For a complete description of the totalizing and printing mechanism for the check sorting machine to perform the functions previously described, reference should be had to the patent to Fuller No. 1,966,623 and especially to the patent to Fuller et al. No. 2,142,352.

The ten key keyboard mechanism for setting up amounts represented on the checks to be sorted is best shown in Figs. 2 to 5, inclusive and so much of this mechanism as is necessary to understand its correlation with the punching machine is disclosed and described herein.

After a key 98 corresponding to a compartment adapted to receive the check has been depressed, and prior to the depression of the motor release bar 97, the amount of the check is set up in the machine, the purpose of this setup mechanism being to cause the entry of the amount in a totalizer related to the compartment selected and the printing of the amount on a tape, so that the tape will exhibit all of the amounts of the checks deposited in the associated compartment, and the totalizer will give the total of such amounts.

Ten key setup mechanism

The machine includes ten numeral keys 420 which are arranged in a conventional ten key keyboard arrangement and upon the protruding ends of the slidable key stems 421. Each key stem 421 (Fig. 2) has a pin and slot connection to key levers 422 pivoted on a rod 423 so that when a key stem is depressed the extremity 424 of the key lever 422 is raised and against the action of a spring 425.

In the differential mechanism the setup pins or stops 426 are arranged in transverse series in which all the pins in each transverse series (Fig. 2) represent the same digit, and the pins are also arranged in longitudinal series (Fig. 5) in numerical order, and all the pins are capable of being selectively set to limit the movement of actuating devices.

As best shown in Fig. 5 slidably mounted in horizontal standards 427 is a frame plate 428 of a pin setup carriage through which the extremities 424 of the key levers 422 project so as to selectively actuate and elevate a pin or stop 426 of the longitudinal series by the depression of a key. The stops 426 are carried by said frame 428 and are guided by upper and lower plates of the frame 428. The stops 426 are raisable and will be retained in elevated position by pins 429 of a spring urged detent plate 430, there being one detent plate 430 for each longitudinal series of stops 426.

Pivotally mounted at 432 on each detent plate 430 is a spring urged hook or latch member 431 engaging a shoulder 433 of a rack 434 slidably mounted in the frame 428. A spring 435 attached to the rack 434 urges the latter to the right to cause the normal engagement of the hook of the latch 431 with the shoulder 433. Obviously, as a stop 426 is raised, the notch therein will, by its cooperation with the pin 429, force the detent plate 430 to the left against the action of a spring connected thereto and through the hook 431 the rack 434 will be shifted slightly to the right against the action of spring 435, and the pin 429 therefor retains the raised stop 424 in elevated position, as is shown for the raised digit stop 424 in Fig. 5 having the numerical value of 2.

The escapement mechanism comprises a plate 438 (Fig. 3) pivoted by trunnions 439 and integral with the plate 438 is an escapement dog 440 normally below an escapement rack 441 carried by the frame 428. During the downward depression of a key in a manner to be subsequently explained, the plate 438 will be rocked about its pivot raising the dog 440 so as to engage a tooth of the rack. At the same time an escapement dog 443 pivoted at 444 to the plate 438 is lifted out of engagement with the tooth it previously engaged and which is now engaged by the dog 440. The dog 443 now being above the plane of the rack 441 will be rocked clockwise by its spring 446 to overlie the next tooth space of the rack 441. During the restoration of the depressed key a spring which will be later referred to will return the plate 438, and dog 440 will now be shifted below the rack 441 and dog 443 will now be in cooperation with the successive tooth space. The frame 428 now being released by the dog 440 is now shifted by a normally tensioned spring 460 (Fig. 4) connected to the frame 428 to an extent of one tooth space of the rack 441 under control of the dog 443. This form of escapement mechanism is well known and is only generally described herein.

Referring to Figs. 2, 4, and 5, a fixed plate 448 is provided with a camming portion 448a which is adapted to rock the latch arm 431 (see Fig.

5) with which it is in cooperation, unlatching it from the rack 434 which is then shifted by the related spring 435 until a shoulder 449 of the rack abuts the raised stop 426. Each rack 434 meshes with a gear 450 having thereon numeral indicia visible through a slot 451 so that the numerical value of the previously depressed key is exhibited.

In this manner successive digits are set up under control of the ten keys 420 to control the differential position of slides 452.

After the setting of the stops 424 has been utilized, the raised stops are depressed to normal and the carriage returned to normal by the following means. Guided in slots in side frames 470 and 471 (Fig. 2) is a rod 472 to which is connected links 473 (Figs. 5) which are connected to arms 474 pivoted at 475. To one of said arms 474 there is connected a link 476 connected to an arm 477 carrying a roller 478 in engagement with a profile cam 479 secured to a drive shaft 94. When said shaft is turned under control of the depression of the motor release bar 97 previously described by means shown in Patent No. 2,131,912, the cam 479 will cause the rod 472 to be moved to the left to engage with the upper beveled portions of the raised stops 424 thus depressing them to normal position and also thereafter engaging the shoulders 449 of the racks 434. The latter are moved back by the rod 472 to normal position where they are relatched by the latch arms 431.

For returning the frame 428 to normal position where it is held in such position by the escapement mechanism one of the arms 474 carries a pin 461 (Fig. 5) which engages an upward extension 462 of a bell crank 463 pivoted at 464 (see Fig. 4). The arm 465 of the bell crank 464 engages a pin 466 carried by the frame 428 and as the bell crank 463 is rocked the frame 428 will be returned to normal position and thus retensioning the spring 460 (Fig. 4).

*Differentially operated operating mechanism controlled by the setup mechanism for effecting entries in accumulators, setting printing mechanisms, etc.*

It will be recalled that the machine includes a differential mechanism which is controlled by the setup mechanism for effecting entries in the selected accumulators, setting up the different printing mechanisms, etc. and while the present improvements do not involve such mechanisms, they will be described herein in order to make it more clear that the setup mechanism will normally control the entries in the accumulator, set up the printing mechanism, etc. so that the present improvements will be more clearly understood when their description is given.

Referring to Fig. 5, the slides 452 are slidably mounted in a frame including side plates 481 having their right ends pivoted to embrace a stud 482. The left ends of the slides 452 are slotted and are slidably mounted by these slots by a rod 483 carried by the side plates 481 of the frame.

Each of the slides 452 carries a stud 484 at its right end which stud is embraced by the bifurcated end of an arm 485 loosely pivoted on a shaft 486.

The arms 485 are normally pressed against a bail rod 487 carried between a pair of arms 488 secured to the shaft 486, by springs 489 stretched between projections 490 at the lower sides of the racks 452 and rods 491 carried between the arms 488.

One of the frame plates 481 carries a roller 492 which, by the weight of the frame, engages the profile of a cam 493 secured to the shaft 94. During the rotation of the cam 493 the left end of the frame drops to bring projections 494 of the slides 452 into correlation with square studs 495 carried by the now differentially positioned racks 434 so that by the movement of the racks 452 to the right urged by the springs 489 under control of the bail rod 487 the slides 452 will move to the right until each projection 494 strikes the correlated stud 495.

The means to effect the rocking movement of the rod 487 is not shown herein since such means are fully shown in the U. S. patent to Brand, 2,131,912. Briefly, it consists of cams which are mounted upon the main operating shaft 94 and such cams cause the counterclockwise rotation of the arm 488 which carries the bail rod 487. The rocking of the bail rod 487 counterclockwise moves the slides 452 through the springs 489 until the slides are stopped in differential positions. The bail rod 487 continues its counterclockwise movement after the slides 452 are arrested, thus merely stretching the springs 489.

The cams referred to then rock the bail rod 487 reversely to restore the slides 452 to their normal position.

It will be understood, therefore, that a series of arms 485 are given differential positions determined by the setup mechanism and as more fully shown and described in the patent to F. L. Fuller et al., 2,142,352, dated January 3, 1939, this differential position of each arm 485 is communicated to a related order of a printing mechanism and accumulating device. It is to be understood, therefore, that the setup mechanism causes the arms 485 to receive differential extents of movement to provide for the proper entry, etc.

*Card punching machine*

Figure 6:
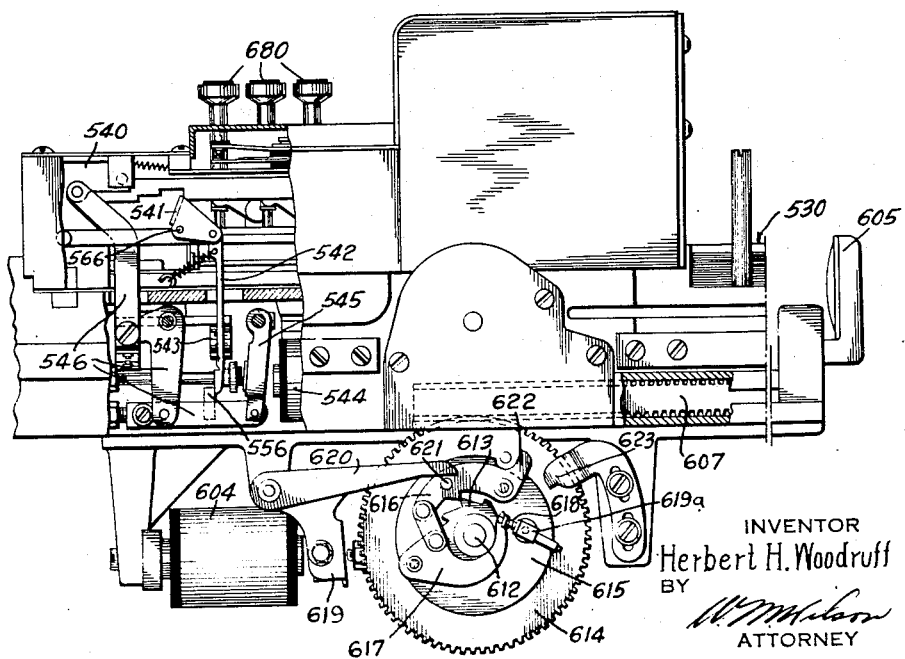
Fig. 6 is an outside view of the punching machine broken away to show certain interior parts.

The card punching machine herein illustrated is of the type shown in the patent to Fred Lee and George Daly, 1,976,618, dated October 9, 1934, and only so much of the operation thereof will be explained as is necessary for an understanding of the operation in connection with the present invention. In general the punching machine contains a feed magazine 530 (Figs. 6 and 7) from which the cards are fed singly from the bottom of the stack by a picker 531 which feeds the cards to a position under the punches 532 (Fig. 7) with the first column of the card in position to receive perforations. From this position the card is engaged at its rear edge by a pusher 534 mounted upon an escapement rack 552 (Fig. 8) which, for each operation of the punches, permits the advance of the card step by step. A series of magnets 535 is adapted to select the punches for actuation in the following manner. Associated with each magnet 535 is a pivoted armature 536 whose free end is connected to a rod 537 which through a bell crank 538 moves an interposer bar 539 to the left in Fig. 8 where it cooperates with a punch bar or plate 540. The forward movement of any interposer bar 539 is adapted to rock a bail 541 pivoted on a rod 566 and which in Fig. 6 is shown as being connected to a spring pressed depending link 542 whose lower free end is adapted to engage and close contacts 543. This, as is fully explained in the aforementioned patent and which will be explained later herein, is adapted to close a circuit through a magnet 544 which, through its armature 545 and link and bell crank connections 546, is adapted to draw downwardly on the pivoted punch bar or plate 540 to force the selected interposer against the associated punch thus perforating the card.

The circuit for the magnet 544 extends in the punching machine from the line side 162 (Fig. 13) through contacts 543 now closed, through contacts 565 now closed, through contacts 525 now closed, to the line side 162. In the present machine, each magnet 535 for punching a digit is connected to the related one of a series of relay contacts R12A—R21A inclusive, pertaining to the same digit. For example, the punch magnet 535 for punching the digit "0" is connected by a related wire 529 to the relay points R21A pertaining to this or the zero digit so that by the previous closure of the relay contacts in a manner to be subsequently described, the 535o magnet will be selected for punching in the card in a column a hole representing "0".

In a manner which will be subsequently described, under control of the keys 420 the relays R12—R21 will be selectively energized so as to close their relay contacts R12A—R21A and also their stick contacts R12B—R21B. It will be noted that upon the selective energization of one of the R12—R21 relays, the energization of the selected relay will be maintained by a circuit from the line 163 through the selected relay, through its B stick contacts and thence by a line through contacts 564, through the contacts 565, thence through contacts 525 to the line side 162. It will also be noted that the circuit for the selective energization of the magnets 535 is from the line side 163 through one of the magnets 535, through the related R12A—R21A contacts, thence through the contacts 564, 565, 525 to the line 162. As will be later described, contacts 564 are subsequently opened after the punching operation so as to cause the deenergization of the selected R12—R21 relay and the selected punch magnet 535.

There are as many magnets 535 as there are index point positions in the card column and each relay contact R12A—R21A is connected by a line 529 to a punch operating magnet 535 associated with a punch 532 for the corresponding index point position.

Summarizing, it will be understood that whenever a magnet 535 is energized it will effect depression of the corresponding rod 537 and will, in a well known manner, force its interposer 539 to the left (Fig. 8) until the end of said interposer overlies the selected punch 532 and is underneath the punch operating plate 540. At the same time the rockable bail 541 having an edge extending into notches formed in all the interposers 539 will be rocked counterclockwise (Fig. 6) to draw up an operating link 542 which will close the pair of contacts 543 thereby energizing the punch operating magnet 544 (Fig. 8). Energization of said magnet causes it to attract its armature 545 drawing a link to the right (Fig. 6), thereby rocking the bell crank 546 counterclockwise to draw down a link pivoted to the punch bar 540. As a consequence of the end of the selected interposer 539 being interposed between the bar 540 and the selected punch 532 said punch 532 will be depressed and will make a perforation in the appropriate index point position of the blank record card.

When the bar 540 is depressed in the foregoing fashion, the left end of the selected interposer will, of course, be depressed thereby rocking a bail 549 pivoted on a rod 553 in a counterclockwise direction (Fig. 8) to raise an escape dog 550 (Fig. 10) and depress a locking dog 551 into engagement with the escapement rack 552, the relation of the dogs being such that the locking dog 551 engages a tooth in the escapement rack 552 before the dog 550 becomes fully disengaged from said rack. The dog 550 is pivotally mounted upon an extension of a shaft 553 supporting the bail 549 (see Fig. 8) and has a slot, the left end of which abuts said shaft. Said dog also has an enlarged hole cooperating with a pin 554 (Fig. 10) fixed to a short arm carried by the shaft 553 and is normally spring urged toward the left by a spring 555 interposed between a fixed part of the frame and a tail formed in the dog.

When the shaft 553 is rocked by the bail 549, the arm fixed in said shaft carrying the pin 554 will be rocked clockwise (Fig. 8) to raise the dog 550 and disengage the nose of said dog from the rack, prior to which, however, the locking dog 551 will engage a tooth of the rack. As soon as the nose of dog 550 clears the tooth of rack 552 which the dog engages, the spring 555 will draw the dog 550 to the left so that the nose of said dog will overlie the space between the next adjacent tooth to the left of the one in which the nose of said dog formerly engaged.

When the magnet 544 is energized, a projection 556 (Fig. 6) extending upwardly from and carried by the link urges the lower end of the hook 542 to the right so that about the time the armature 545 reaches the limit of its movement to the right the hook 542 will become disengaged from one of the spring contact members carrying the contacts 543 so as to permit said contacts to open immediately, thereby deenergizing the magnet 544 which will then release its armature allowing a spring 557 (Fig. 8) to rock the plate 540 upwardly and permit the selected interposer 539 to rise and thereafter be restored to normal position by means of a spring 558.

As a consequence of the deenergization of the magnet 544, the bail 549 will rock clockwise to its normal position shown in Fig. 8 and the dog 551 will be raised to release the rack 552 which will then move one column space to the left by the usual spring barrel. Since the dog 550 overlies the interdental space between the next two adjacent teeth to the left, said dog will ride into said space and prevent the rack 552 from escaping more than one tooth space which corresponds to the distance between columns of the record card.

It will thus be seen that each time one of the keys 420 is depressed, one of the magnets 535 will be energized, if the machine is conditioned for such selective energization, and will select a punch 532 for operation, the punch selected corresponding, of course, to the particular key depressed.

It is desirable that the circuits through the magnets 535 be broken after the magnet 544 has been energized to operate a selected punch and also to break the circuit through the selected relay R12—R21 and that said circuits remain open until the carriage has completely escaped one column space so that premature energization of the magnet 535 may be prevented. For this purpose, there is provided mechanism illustrated in Fig. 10 and which is fully shown and described in the patent to W. F. Gutgesell, No. 1,939,049.

Pivotally mounted on the shaft 553 adjacent the dog is a member 559 overlying the upper edge of the dog 550 so that when said dog is raised, the pin 554, as described, and the member 559 will be rocked clockwise (Fig 10). The member 559 has a pin 561 underlying a block of insulating material 562 carried by a spring contact member of contacts 564 which are mounted upon and insulated from a fixed part of the frame. The contacts are so disposed that, when in the position shown in Fig. 10, they will be closed by engaging each other. When the dog 550 is raised by the pin 561 by consequence of the rocking of the bail 549 counterclockwise (Fig. 8), the member 559 will be rocked clockwise (Fig. 8), thereby raising the pin 561 and opening the contacts 564 to break the circuits closed therethrough.

In order to hold the contacts 564 in contact with each other until the carriage has fully escaped there is provided mechanism controlled by the rockable bail 541 which holds the pin 561 in elevated position until the dog 550 has been rocked back into engagement with the next adjacent tooth in rack 552. This mechanism comprises a T-shaped member 563 fixed upon the shaft 566 upon which is fixedly mounted the bail 541.

Pivotally mounted on the shaft 566 is a spring operated member 567 having a lug 568 which normally engages the left side (Fig. 10) of a transverse lug 569 formed in the member 559. The member 567 is normally in the position shown in Fig. 10 with its coiled operating spring holding a bent-over lug 570 in said member in engagement with a lug 571 formed in the T-shaped member 563, the coil spring operating the member 567 being interposed between a lug 572 in the member 563 and the left edge of lug 568 in member 567.

When the bail 541 is rocked counterclockwise due to the leftward movement of one of the punch interposers 539 (Fig. 8), the T-shaped member 563 will be rocked clockwise as in Fig. 10 but the lug 568 will be held by the lug 569 and prevented from movement as a consequence of which the coil spring interposed between the lugs 572 and 568 will be tensioned. After the bail 541 has rocked far enough to close the contacts 543 the magnet 544 will be energized, thereby rocking the bail 549 and shaft 553 in a clockwise direction as shown in Fig. 10 to raise the dog 550 and rock the member 559 clockwise.

As a consequence of this movement, the lug 569 will be carried upwardly and will clear the lug 568 which, it will be remembered, is held stationary by the lug 569 during the rocking of the bail 541, as described, so that the coil spring between lugs 572, 568 will cause the lug 568 to snap under the lug 569 and prevent the member 559 from being restored when the dog 550 rides down into the next tooth space to the left (Fig. 8) and will be held in this position until the bail 541 is restored to normal position (Fig. 8).

As a consequence of the deenergization of the punch magnet 544, the bail 549 will rock clockwise (Fig. 8) and the selected interposer 539 will be restored by its spring 558, thereby permitting the bail 541 to rock back to its normal position as shown in Fig. 8.

The lug 568 is so proportioned that it will not clear the lug 569 in member 559 until the bail 541 has reached its home position. Consequently, the contacts 564 cannot reclose until bail 541 has been permitted to return to its normal position, which, of course, will not happen until the selected interposer has likewise returned to its normal position. The contacts 564 are connected in the circuit to the magnets 535 (see Fig. 13) so that it will be clear that the magnets 535 cannot be energized during the period in which the contacts 564 are open.

Carriage skipping mechanism

It is believed to be unnecessary to describe the skipping mechanism as it is well known and fully shown and described in the patents to Schaaf, 1,426,223, and N. L. Reed, 1,962,750.

In Fig. 10, the reference numeral 132 designates the skip lifter employed in the skipping mechanism and reference numeral 99 designates the skip bar which is preformed with notches and camming edges so that the punch carriage may be automatically skipped to a predetermined position after punching operations. The last mentioned elements correspond to elements similarly identified in the Schaaf patent, 1,426,223, and their function and operation are precisely the same as that explained in this patent.

It is to be understood that, when the machine is so conditioned, the successive depression of the keys 420 will cause a step-by-step movement of the punch carriage concomitantly with successive punching operations. This will enable the punching of the classification number upon the record card. Thereafter successive depressions of the keys 420 will cause the punching of the card to represent the amount on the check and when the two fields of the card have been so punched, the skipping mechanism will be rendered effective in accordance with the construction of the skip bar 99 so that the carriage will be automatically skipped to the last column position to close contacts 580 (Fig. 10). When the rack 552 occupies the last column position, a projection 581 (Fig. 10) thereof is adapted to close and maintain contacts 580 closed and open contacts 565.

Figure 13:
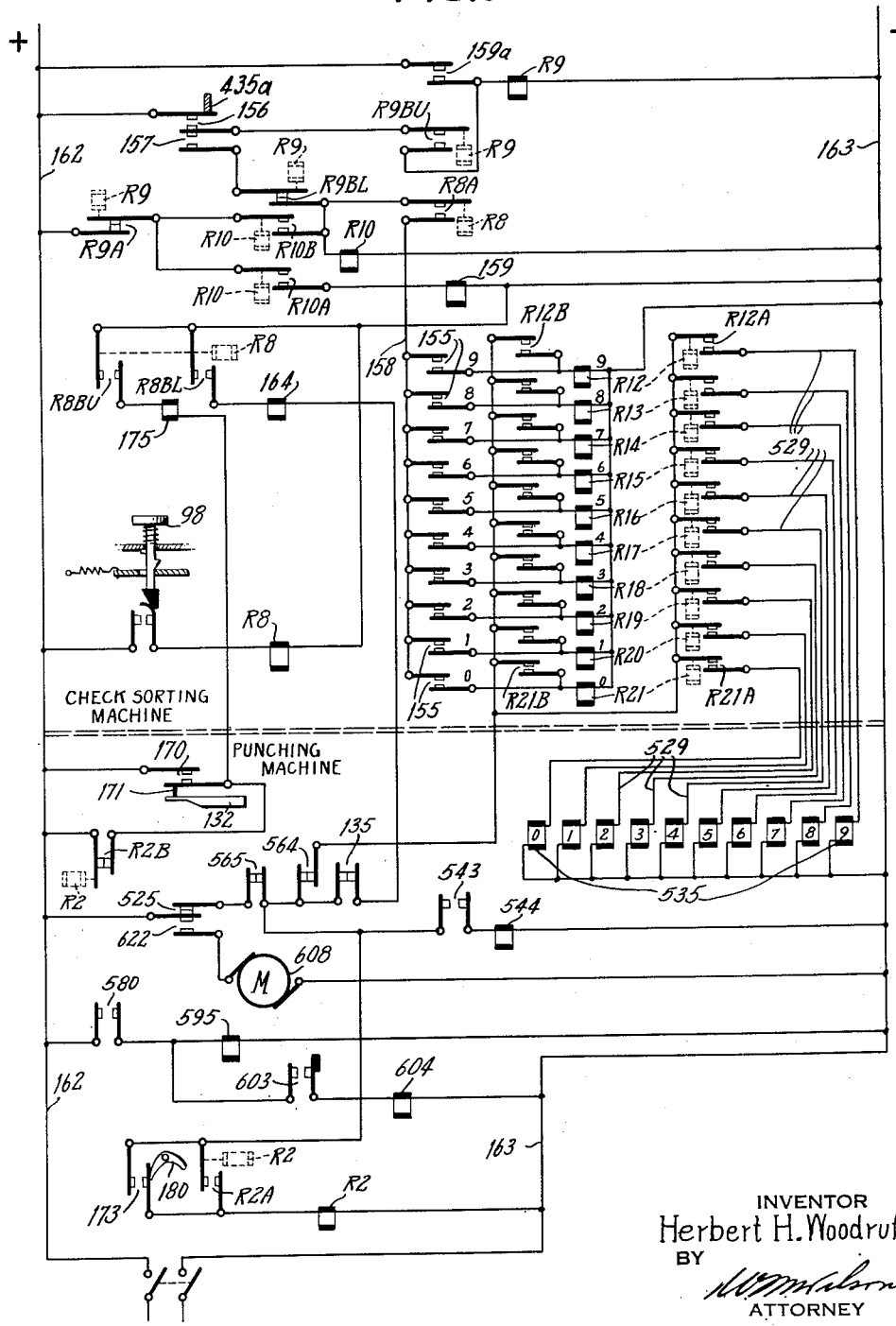
Fig. 13 is a preferred wiring diagram of the electrical parts of the machine.

The present machine is also provided with a card ejecting mechanism and a power driven card feeding mechanism so that a new card is fed to the carriage after the punched card has been ejected. These mechanisms are also well known in the art and are shown in the patents to Lee and Daly, No. 1,976,618; F. M. Carroll, No. 1,976,600, and H. L. Reed, No. 1,962,750, and for this reason are only generally explained herein. The card ejecting mechanism is shown in Fig. 9 and is set in operation by closure of contacts 580 which cause, as shown in Fig. 13, the energization of the card ejecting control magnet 595. The operation of the card ejecting mechanism is described as follows:

Card ejecting and card feeding mechanism

Stated generally, the gripper comprises a pair of jaws 583 and 584 (Fig. 9) urged together by a flat spring 585 but the abutment of a pin 586 with the upper jaw 583 separates the jaws in order that the punched card may be received by the slit-like separation. The card occupies a position between the jaws at the termination of the punching of the last columns of the card.

The gripper is pivotally mounted on a shaft 587 to which is secured a gear 588 adapted to be driven by a gear 589 through an idler gear. Meshing with gear 589 is a slidably mounted rack 590 the extremity of which terminates in an adjustable cylindrical plunger 591. During the previous restoration of the card carriage, the end of rack 552 engages plunger 591 to shift rack 590 to the left against the tension of a spring 592. This caused a clockwise movement of shaft 587 through the train of gears 588—589 to bring the gripper unit to the position shown in Fig. 9, whereupon a latch lever 593 engaged a shoulder 594 of the lower jaw 584. Incidentally, a certain amount of compression was stored up in spring 592. Shifting of latch 593 is effected by energization of the magnet 595 which attracts its armature 596 when the magnet is energized. This causes a shifting movement of a link 597 to the right and by means of a cam shoulder 598 an arm 599 secured to the pivot shaft of latch 593 will rock the latter.

This will result in the release of spring 592 to cause the counterclockwise rotation of the gripper unit. As the jaw 583 leaves pin 586 spring 585 will act to close the jaw 583 upon the lower jaw 584 thus securely gripping the card and flipping the same in reversed position. A stationary pin 600 may suitably coact with one of the jaws to separate them, permitting the released card to fall into a receptacle 601. As the card is ejected, shifting of rack 590 by spring 592 will cause a square shoulder 602 to engage and close contacts 603. Since contacts 603 are now closed as well as contacts 580, it will be seen from Fig. 13 that a circuit will be completed to a clutch control magnet 604 to energize the latter.

It will now be made clear that after the card has been ejected, the motor restoring mechanism will be set into operation to automatically restore the card carriage without attention of the operator.

In Fig. 7 the picker 531 is connected through a handle 605 to a rack 607 (Fig. 6) which handle may be actuated to the left to introduce a new card from the magazine 530 to punching position. Secured to the underside of the base of the machine is a motor 608 (see Fig. 8) having a coupling connection to a stud shaft 609 to which is secured a worm 610 meshing with a worm wheel 611 secured to a shaft 612 one end of which has secured thereto a ratchet-shaped clutch element 613 (Fig. 6). Loosely mounted on shaft 612 is a gear 614 meshing with teeth on the underside of rack 607 and to which gear is secured a disk 615. Pivoted upon the disk 615 is an arm 616 having a single clutch tooth. The free end of arm 616 is connected by a link to a toggle plate 617, the end of the toggle plate distant from its pivot being articulated to a rod 618, slidably mounted in a member 619a pivoted upon the disk 615. The parts are spring held in the position of Fig. 6 which they occupy normally. By virtue of this construction rod 618 and plate 617 act as a toggle, the spring acting to impositively hold the tooth of arm 616 in or out of engagement with the clutch teeth of ratchet wheel 613.

For the purpose of effecting the clutching action, the magnet 604 is provided and when energized attracts an armature 619 so that an arm 620 engaging the pin 621 of arm 616 will rock the tooth thereon into engagement with ratchet wheel 613. Through the connecting link the toggle connection will be moved centrifugally to its other position wherein the spring on rod 618 will act to hold the clutch tooth in engagement with the ratchet teeth. Gear 614 will thereupon be driven in a counterclockwise direction substantially a single revolution, shifting rack 607 to the left just as if it were caused by movement of handle 605. This will similarly result in moving the card pushers and fingers to control the positioning of the cards.

At the termination of the counterclockwise movement of gear 604, a tail 622 will strike a projection 623 of a fixed plate to effect the disengagement of the arm 616 and ratchet wheel 613 by a reverse action.

Also secured to the pivot of armature 619 is an arm 624 (Fig. 8), the free end of which is adapted to bear upon an insulating block to open contacts 525 when magnet 604 is energized. Contacts 525 are retained open by a latching bell crank 625 which is adapted to be struck by bent-up plate 626 secured to gear 614 at the termination of the driving movement of the latter. Below contacts 525 are motor-control contacts 622 which are latched closed upon energization of magnet 604 to complete the motor circuit to motor 608 (see Fig. 13) and are unlatched to stop the motor at the termination of the driving operation in the manner just described.

*General description of operation in connection with wiring diagram*

The complete operation of the machine will now be given, particularly in connection with the wiring diagram of Fig. 13. It will be assumed that the operator has picked up a check which contains a classification number, No. 123, for example, which is one of the miscellaneous classifications and which is to be sorted in a selected compartment. It will also be assumed that the check bears the amount $45.67. For such operations of the machine, a selected key 98 will be depressed and it is pointed out that the bank of keys 98 is of the so-called "flexible" type. That is to say, upon the depression of a key 98, it will remain closed until any other key of the four banks is depressed which will release the previously depressed key and the newly depressed key will remain in latched position. This is fully shown and described in the patent to Brand, No. 2,131,912, previously referred to and fully shown in Fig. 7 of this patent.

Referring to the wiring diagram, the depression of the special key 98 will cause the closure of its contacts, thereby connecting the relay R8 across the lines 162 and 163 and such relay will remain energized during the entry operations of the machine effected by the keys 420, the concomitant operation of the punching machine effected by the depression of the keys 420 and also the item entering and listing operations effected by the subsequent depression of the motor release bar 97. In other words, relay R8 will remain energized until another key 98 is depressed as has been previously described. The energization of the relay R8 will close its contacts R8A, R8BL and R8BU, U designating the upper contacts and L the lower contacts of a multiple contact bank. These contacts will remain closed since the relay R8 is energized.

Referring particularly to Fig. 2, it will be noted that underlying the series of keys 420 is a multiple contact bank which comprises a series of contacts 155 which are selectively closed by related keys. In the problem assumed, since the "1" key 420 is depressed, the related "1" contacts shown in Fig. 13 will be closed. The contacts 155 are so arranged that upon the initial depression of the related key, the contacts will be closed. Also as shown in Fig. 2 underlying the bail 435a are multiple contacts consisting of contacts 156 and 157. Upon the initial depression of the key, the contacts 156 will close substantially at the time the key contacts 155 are closed and thereafter contacts 157 will be closed by the bail 435a at the time the key has been fully depressed. Upon the closure of contacts 157, a circuit will be closed from the line 162 (Fig. 13) through contacts 156, 157, thence through contacts R9BL which are now closed in the position shown, through contacts R8A now closed, thence to the common line side 158 of the series of key operated contacts 155, thence through the selected "1" contacts now closed to the related relay which, in the example assumed, since the "1" key is depressed, will be the R20 relay, the circuit then extending to the other line side 163. The relay R20 will close its stick contacts R20B, the stick circuit being extended back through the contacts 564, 565, 525 to the line 162. It will be recalled that the energization of a selected relay R12—R21 will close the related contacts and, in the example assumed, R20A will be closed, thereby extending the circuit to a selected "1" punch magnet 535 and thence to the line 163. This will, as previously described, cause the operation of the punch so that, with the card in the initial punching position, the first column will be perforated to represent "1." When the punch has been completely operated and the carriage has escaped to the second column position, contacts 564 will be opened, thereby breaking the stick circuit to the selected relay R12—R21 and also to the selected punch magnet 535.

Upon the full depression of one of the keys 420, the contacts 157 are closed so that the circuit is continued through such contacts through relay contacts R9BL thence to the escapement control relay R10 to the line side 163. The energization of the relay R10 will close its stick contacts R10B, the stick circuit leading back through relay contacts R9A now closed to the line 162. The energization of the relay R10 will close its contacts R10A, thereby completing a circuit from the line 162 through the relay contacts R9A, through the relay contacts R10A now closed, to and through the escapement operating magnet 159 to the line 163. The escapement operating magnet 159 is shown in Fig. 2 and it will be observed that its armature 160 is attached to the plate 438 of the escapement mechanism so that the energization of the magnet 159 will rock the plate and allow the pin-setup carriage to escape one step. However, as will be later described, such movement will, under the circumstances now being described, be prevented. The armature 160 of the escapement operating magnet 159 is provided with an upstanding member 161 which is in contact with blade contacts 159a, thereby closing such contacts and as shown in Fig. 13 connecting the relay R9 across the line wires 162 and 163. These contacts 159a are closed at substantially the time the dog 443 is lifted out of engagement with the tooth of the rack. Upon the energization of the relay R9, relay contacts R9BL will be open, thereby opening the circuit from the line 162 to the line 158 to prevent any energization of the relay magnets R12 to R21 inclusive by the depression of another operating key 420. The relay contacts R9A are also open to break the stick circuit to the relay R10. The stick circuit for the relay R9 is back through the relay contacts R9BU and the contacts 156 and as the depressed key returns to its normal position, contacts 156 will open, thereby opening the stick circuit to the relay R9.

The deenergization of the escapement operating magnet 159 by the opening of contacts R9A will enable the plate 438 of the escapement to return to normal position by means of the resiliency by one of the contact blades of contacts 162. The escapement dogs will now re-engage the teeth of the rack 441 and if the pin-setup carriage had not been restrained against movement, the carriage would have moved one step.

As intimated previously, during the depression of the operating keys 420, there is a concomitant operation of the operation of the punching machine to punch the classification number of the check but at the same time means will be operative to prevent the setup of such number in the pin-setup mechanism. In general, this is prevented by shifting the pin-setup carriage 428 to the right as shown in Fig. 2 to such a position that the extremities 424 of the key levers 422 will be ineffective to raise any of the pins 426. While any number of equivalent devices might be utilized to effect this function, it is preferred to accomplish this function by electromagnetic means which will now be described in detail.

Referring to Fig. 2, it will be seen that, by means of a frame plate 153, a solenoid 164 is mounted. The movable core 165 of the solenoid has secured thereto a stud 166 which is slidably mounted in a depending U-shaped plate 167 which is attached to the pin-setup carriage 428. The stud 166 has secured thereto a collar 168 and is so arranged on the stud 166 that the energization of the solenoid 164 will withdraw the core 165 within the solenoid, and in so doing the collar 168, bearing against the U-shaped plate 167, will move the pin-setup carriage 428 to the right so that the first column of pins 426 will now be out of range of movement of the extremities 424 of the key operated levers 422. There is sufficient slack in the escapement mechanism to allow this shift of the pin-setup carriage to the desired position.

The circuit for effecting the energization of the solenoid 164 as shown in Fig. 13 is from the line 163 through the relay contacts R8BL, thence through the solenoid 164, thence through cutout contacts 135 in the punching machine, thence through contacts 565 and 525 to the line 162. All of the contacts in the punching machine are normally closed and, since the relay contacts R8BL have been closed by the energization of the relay R8, it will be observed that the solenoid maintains the setup carriage in such position that even though the keys 420 are successively operated in accordance with the digits of the check classification none of the pins therein will be set up. Obviously, since the carriage is maintained in such position, the operation of the escapement mechanism by the escapement operating magnet 159 will be ineffective. It is obvious, therefore, that while punching operations are being performed to punch upon the record column the digits of the classification number, there will be no entry in the setup mechanism until the field associated with the classification number has been punched. Assuming that three columns are allocated for such digits, the depression of the keys to enter the amount on the check will then enable this amount to be set up in the matically operates and which will now be described in detail.

The energization of the solenoid 164 is retained during the operation of the punching machine pin-setup mechanism by means which automatically for punching the classification number and the control for effecting the energization of the solenoid is provided by the contacts 135 which are located in the punching machine. These contacts are shown in Figs. 11 and 12 and correspond to the similarly designated contacts in the patent to F. Lee et al., 1,976,618. The contacts 135 are the well known "cutout" contacts for the punching machine which, in the machine shown in the patent, are utilized to prevent duplication of certain data which is on a master card. In the present machine, such contacts are utilized to control the energization of the solenoid 164.

As is more fully described in the patent, the control for the contacts 135 consists of a bar 152 which is formed with either cutout portions or cam portions and in Fig. 11a the formation of the bar for the present problem is shown. The bar 152 is attached to the card carriage and coacts with a depending extension 146 of a lever 144 pivoted at 145 to a bracket and said extension engages a bail 147 which is pivotally mounted on a shaft 148 and which bail has a depending extension 149 engaging a blade of the contacts 135. The left hand portion of the bar 152 is provided with a depression which coacts with the depending extension 146, and thereby enables the contacts 135 to remain in their normal closed position during three steps of movement of the card carriage. However, as the card carriage is moved to the fourth column position, the cam or high portion of the bar 152 will rock the extension 146 and, by the engagement with the bail rod 147, will rock said bail to enable the depending extension 149 to open the contacts 135. When such contacts open, it will be noted that the circuit to the solenoid 164 is broken and, therefore, the pin-setup carriage shown in Fig. 2 will now occupy its normal position so that successive depressions of the keys 420, which are for the purpose of entering the amount of the check in the setup mechanism, will cause the carriage to be stepped step by step under control of the escapement mechanism which is now effective. The pins 426 will, of course, be elevated to represent the digits corresponding to the amount on the check.

The pin-setup mechanism has a capacity of nine digit setups and if the amount on the check is less than this, the "0" key 420 will be successively operated. In the problem assumed, the amount on the check is $45.67 and, therefore, the "0" key will be operated five times, concomitantly punching the zeroes at the left of the card field for designating the amount on the card. Thereafter, the digit keys corresponding to the amount on the check are successively depressed to perforate this amount on the card. All during this time the bar 152 will retain the contacts 135 open to deenergize the solenoid 164.

Upon completion of the punching of the amount in the related card field, the carriage skipping mechanism will then be effective to skip the carriage to the last column position.

Upon skipping of the carriage to the last column position under control of a skip bar, when the card carriage occupies the last column position, the projection 581 on the carriage is adapted to close and maintain contacts 580 closed and contacts 565 open. Contacts 580 correspond to contacts 191 in Figs. 11 and 15 of Patent No. 1,976,618, and which operation is fully explained therein. Referring to Fig. 13, it will be noted that the closure of contacts 580 will effect the energization of the magnet 595 which, it will be recalled, will cause the energization of the card ejecting mechanism and as the latter is set into operation, contacts 603 are closed. Referring to Fig. 13 with contacts 580 now closed and contacts 603 closed at this time, the magnet 604 will be energized.

It will now be made clear that after a card has been ejected, the motor restoring mechanism will be set into operation to automatically restore the card carriage without attention of the operator.

Magnet 604 (Fig. 8) corresponds to the magnet designated 175 in Patent No. 1,976,618 and as explained therein and also in this specification, upon the energization of this magnet, it will cause the opening of contacts 525 and the closure of contacts 622. The closure of the last mentioned contacts causes the motor 608 to be connected across the line so that the motor will run and at the same time the clutch connection is effected between the motor shaft and the drive shaft 612. The rotation of this shaft will thereupon cause the card carriage to be restored and the rack 607 moved to the left and cause the picker 531 (Fig. 7) to feed a new blank card and place the same upon the carriage.

While the punching machine is performing these incidental operations, the operator can depress the motor release bar so that the item entering, check feeding, and listing operations may be effected by the machine. It will be noted that these incidental operations are performed in the punching machine without any attention on the part of the operator so that the punching machine is now reconditioned for the next card punching operation when the appropriate miscellaneous key 98 is depressed. In the event that such key is not depressed, it will be noted that card punching operations will not be effected and the machine will operate in the usual manner.

*Precautionary locking devices*

While the machine shown and described is practically operative for the purposes and functions mentioned, it is desirable to utilize certain interlocks and locks so as to prevent accidental or intentional misoperations of the machine. These interlocks are in the nature of precautionary devices and their construction and operation will now be described in detail:

Such precautionary devices include a locking mechanism for locking the keys during certain operations of the machine and includes a magnet 175 (Figs. 2 and 13) which, upon the energization, attracts its armature 176 and through an interconnecting plate 177 rocks a locking plate 178 upwardly. The locking plate will bring a shoulder in front of a depending extension 179 of the bail 135a. The locking magnet 175 is energized under different circumstances, one of which is during the skipping of the card carriage to the last card column position and the energition is controlled by contacts 170, shown in Fig. 13 and Fig. 10. The skip lifter 132 shown in Fig. 10 supports rod 171 upon which one contact blade of the contacts 170 rests. It will be recalled that the skip lifter 132 is elevated so as to raise the dog 550 when skipping operations are to be effected and the elevation of the skip lifter 132 will raise the rod 172 and close contacts 170. From Fig. 13, it will be noted that the circuit for the lock magnet 175 extends from the line 163 through relay contacts R8BU now closed, through the lock magnet 175, thence through contacts 170 which are closed during the skipping of the carriage to the line 162. Since the energization of the lock magnet 175 will lock the bail 135a against movement by the operation keys 420, none of these may be actuated during the skipping of the carriage, thereby preventing any possible misoperations of the machine.

The keys 420 are also locked upon the failure of a card to feed in the punch bed of the punch machine and as is well known, punching machines of the type used in connection with the present invention are each provided with a card lever 180 (Fig. 13) which is in the path of the cards being fed from the supply hopper and are actuated thereby to close contacts 173. The closure of contacts 173 will close a circuit from the line 163 through a card lever relay R2, through contacts 173, thence through contacts 565 and 525 to the line side 162. The relay R2 will close its stick contacts R2A. Since cards are feeding to the punch bed, the relay R2 will be energized, thereby opening its contacts R2B; but whenever the supply of cards is exhausted by the failure of a card to feed to the punch bed, the relay R2 will be deenergized, enabling the R2B contacts to close. The latter are in shunt with the contacts 170, so that with the closure of relay contacts R2B, the lock magnet 175 will be energized, provided the check punching machine is selected for operation, due to the previous energization of relay R8 and the closure of its contacts R8BU. Under such circumstances, the operating keys will be locked, apprising the operator of the failure of card feed or the exhaustion of the card supply and when this is remedied, the card lever contacts 173 will be closed by the card lever 180 and by the circuit previously traced the magnet 175 will be deenergized and the operating keys 420 are now free for depression.

While there has been shown and described and pointed out the fundamental novel features of the invention as applied to a single modification, it will be understood that various omissions and substitutions and changes in the form and details of the device illustrated and in its operation may be made by those skilled in the art without department from the spirit of the invention. It is the intention therefore to be limited only as indicated by the scope of the following claims:

What is claimed is:

1. In a punching machine, the combination with a ten key keyboard, of card punching means controlled by the ten key keyboard for successively punching two fields of different data on a card according to the keys operated, means for selectively effecting a connection between the ten key keyboard and said punching means to render the latter effective for punching, and means controlled by said punching means for controlling the operation of said keys for determining the number of key operations of the keyboard which are utilized for a change in the data punching from one field to the other.

2. In a combined sorting and punching machine provided with a plurality of sorting compartments selected by compartment selecting keys, the combination with keys of a ten key keyboard, of a card punching machine including card punching means controlled by the keys of said ten key keyboard for punching data according to the ten keys operated, means controlled by one of said compartment selecting keys for selectively effecting a connection between the keys of the ten key keyboard and said punching means to render the latter effective for punching a card, and means controlled by said punching machine for controlling the operation of said keys for determining the number of key operations which are utilized for a change in the data punching controlled by the keys thereof.

3. In a punching machine, the combination with manually controlled means, of digit setup means controlled thereby, a card punching means, means controlled by said manually controlled means for effecting the operation of said punching means, means for rendering said manually controlled means ineffective to cause the operation of said digit setup means to set up certain data punched on a card, and means controlled by said punching means to render said last named means ineffective after the punching of said certain data, whereby said manually controlled means will be effective to concomitantly cause the operation of said punching means and the operation of said digit setup means.

4. In a punching machine, the combination with ten keys of a keyboard, of digit setup means controlled thereby, and successively set up to represent data to be entered, a card punching means, means controlled by said ten keys for effecting the successive operation of said punching means, means for rendering said ten keys ineffective to cause the successive operation of said digit setup means to set up certain data which is punched on a card, and means controlled by said punching means to render said last named means ineffective after the punching of said certain data, whereby said ten keys will then be effective to concomitantly and successively cause the operation of said punching means and the operation of said digit setup means.

5. In a punching machine, the combination with a plurality of keys, of digit setup means controlled thereby, a card punching means including a carriage carrying a card to be punched and moved step by step as successive punching operations are effected under control of said keys, means controlled by said keys for effecting the operation of said punching means to successively punch a card to represent data as said keys are operated, means to render said setup means ineffective during the operation of the keys to punch certain data, and means controlled by said carriage to disable said last named means whereby said keys then cause the operation of said setup means concomitantly with successive card punching operations.

6. In a punching machine, the combination with a plurality of keys, of digit setup means controlled thereby, a card punching means including a member moved step by step as successive punching operations are effected on the card, means controlled by said keys for effecting the step by step movement of said member and the operation of said punching means to successively punch a card to represent data as said keys are operated, means to render said setup means ineffective during the operation of the keys to punch certain data, and means controlled by said member and rendered effective after a predetermined number of key operations to disable said last named means whereby said keys then cause the operation of said setup means concomitantly with successive card punching operations.

7. In a punching machine, the combination with a plurality of keys, of digit setup means controlled thereby, card punching means operable successively to punch data, means controlled by said manually controlled means for effecting the successive operation of said punching means as said keys are operated to punch data in accordance with the keys operated, means to render said setup means ineffective during the operation of the keys to punch certain data, means operable step by step concomitantly with the successive punching operations, and means controlled thereby for disabling the means which renders the setup means ineffective whereby said keys will concomitantly punch a card to represent data and effect the operation of said setup means to set up the same data.

8. In a punching machine, the combination with a plurality of keys, of digit setup means controlled thereby, card punching means operable successively to punch data, means controlled by said manually controlled means for effecting the successive operation of said punching means as said keys are operated to punch data in accordance with the keys operated, means operable prior to a key operation to render said setup means ineffective during the operation of the keys to punch certain data, means operable step by step as said keys are operated for effecting the successive punching operations, and means controlled thereby for disabling the means which renders the setup means ineffective whereby said keys will then concomitantly punch a card to represent data and effect the operation of said setup means to set up the same data.

9. In a combined sorting and punching machine provided with a plurality of record sorting compartments selected by a plurality of manually controlled compartment selecting means, the combination with a punching machine including punching means for punching a card, of a plurality of keys, digit setup means controlled by said keys, means controlled by said keys for causing the operation of said punching means to successively punch a card to represent the data corresponding to the keys operated, means controlled by one of said compartment selecting means for effecting a connection between the keys and said punching means to render the latter effective for punching, means controlled by one of said compartment selecting means for rendering said digit setup means ineffective under control of the controlling keys, and means operable after a predetermined number of key operations for disabling said last mentioned means when the card has been punched to represent certain data, whereby further operations of said keys cause the punching of said card to represent other data and concomitantly effect the operation of said setup means to represent the same data.

10. In a combined sorting and punching machine provided with a plurality of sorting compartments selected by a plurality of compartment selecting means, the combination with a punching machine including a carriage carrying a card to be punched and moved step by step with successive punching operations, of a plurality of keys, digit setup means controlled by said keys, means controlled by said keys for causing the operation of said punching machine to successively punch a card to represent the data corresponding to the keys operated and the record to be sorted, means controlled by one of said compartment selecting means for effecting a connection between the keys and said punching means to render the latter effective for punching, means controlled by one of said compartment selecting means for rendering said digit setup means ineffective under control of the controlling keys, and means controlled by said carriage for disabling said last mentioned means when the card has been punched to represent certain data, whereby further operations of said keys cause the punching of said card to represent other data and concomitantly effect the operation of said setup means to represent the same data.

11. In a punching machine, the combination of keys of a ten key keyboard, digit setup means set thereby, a card punching means, means controlled directly by the keys of said keyboard for effecting as the keys are operated the operation of a card carriage of said punching means to punch a card to represent different data, means operable by the carriage to prevent said setup means from being set by the operation of the keys as they are operated to punch certain data, and automatic means operable by the carriage after a plurality of key punching operations to subsequently disable said last named means to enable said setup means to be set as said keys are subsequently operated to punch other data.

12. In a punching machine, the combination of a plurality of punch controlling keys, digit setup means set thereby, a card punching means, means controlled directly by the keys for effecting as the keys are operated the operation of a card carriage of said punching means to punch a card to represent different data, means operable by the carriage to prevent said setup means from being set by the operation of the keys as the keys are operated to punch certain data, and automatic means operable by the carriage after a plurality of key punching operations to subsequently disable said last named means to enable said setup means to be set as said keys are subsequently operated to punch other data.

HERBERT H. WOODRUFF.